United States Patent
Chang et al.

(10) Patent No.: US 8,542,628 B2
(45) Date of Patent: Sep. 24, 2013

(54) APPARATUS AND METHOD FOR CONFIGURING FRAME STRUCTURE IN RELAY WIRELESS COMMUNICATION SYSTEM

(75) Inventors: Young-Bin Chang, Anyang-si (KR); Mi-Hyun Lee, Seongnam-si (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/924,090

(22) Filed: Sep. 20, 2010

(65) Prior Publication Data

US 2011/0069743 A1 Mar. 24, 2011

(30) Foreign Application Priority Data

Sep. 19, 2009 (KR) .................. 10-2009-0088782
Sep. 22, 2009 (KR) .................. 10-2009-0089823
Oct. 29, 2009 (KR) .................. 10-2009-0103773

(51) Int. Cl.
*H04B 7/212* (2006.01)
*H04B 3/36* (2006.01)

(52) U.S. Cl.
USPC ............................. 370/324; 455/7

(58) Field of Classification Search
None
See application file for complete search history.

(56) References Cited

U.S. PATENT DOCUMENTS

| | | | |
|---|---|---|---|
| 2007/0019667 A1* | 1/2007 | Mottier et al. | 370/458 |
| 2008/0095038 A1* | 4/2008 | Chang et al. | 370/208 |
| 2008/0107073 A1* | 5/2008 | Hart et al. | 370/330 |
| 2012/0039221 A1* | 2/2012 | Lim et al. | 370/280 |

OTHER PUBLICATIONS

International Search Report to PCT/KR/2010/006438, dated Jun. 27, 2011, (3 pages).
Written Opinion of the International Searching Authority to PCT/KR2010/06438, Jun. 27, 2011 (5 pages).
IEEE Std 802.16j—2009, "Part 16: Air Interface for Broadband Wireless Access Systems—Amendment 1: Multihop Relay Specification", Jun. 12, 2009 (pp. 292-302).
L. Wang, et al., "Resource Allocation for OFDMA Relay-Enhanced System with Cooperative Selection Diversity," 2009 IEEE Wireless Communications and Networking Conference Apr. 8, 2009 (pp. 1-6).
M. Okuda, et al., "Multihop Relay Extension for WiMAX Networks—Overview and Benefits of IEEE 802.16j Standard," Fujitsu Sci. Tech. J., vol. 44, No. 3, Jul. 2008 (pp. 293-302).

* cited by examiner

*Primary Examiner* — Eunsook Choi

(57) ABSTRACT

An apparatus and method for reduces an overhead caused by an operation transition gap in a Relay Station (RS) of a relay wireless communication system. The method includes identifying a signal delay time with an upper node. A transmission/reception operation transition time is determined through a negotiation with the upper node. An idle time is identified. An overhead caused by a transmission/reception operation transition is determined with consideration of a start time point of an Uplink (UL) subframe dependent on the signal delay time, the transmission/reception operation transition time, and the idle time. And communication is performed considering the overhead. The start time point of the UL subframe is set earlier than a start time point of a UL subframe of the upper node in consideration of the idle time.

25 Claims, 9 Drawing Sheets

APPARATUS AND METHOD FOR CONFIGURING FRAME STRUCTURE IN RELAY WIRELESS COMMUNICATION SYSTEM

CROSS-REFERENCE TO RELATED APPLICATION(S) AND CLAIM OF PRIORITY

This application is related to and claims priority under 35 U.S.C. §119(a) to a Korean Patent Application filed in the Korean Intellectual Property Office on Sep. 19, 2009 and assigned Serial No. 10-2009-0088782, a Korean Patent Application filed in the Korean Intellectual Property Office on Sep. 22, 2009 and assigned Serial No. 10-2009-0089823, a Korean Patent Application filed in the Korean Intellectual Property Office on Oct. 29, 2009 and assigned Serial No. 10-2009-0103773, the contents of which are herein incorporated by reference.

TECHNICAL FIELD OF THE INVENTION

The present invention relates to an apparatus and method for providing a relay service in a relay wireless communication system. More particularly, the present invention relates to an apparatus and method for configuring a frame structure, for providing a relay service in a relay wireless communication system.

BACKGROUND OF THE INVENTION

In order to provide a wireless channel to a Mobile Station (MS) located in a cell edge or a shadow area, a wireless communication system provides a relay service using a Relay Station (RS). For example, the wireless communication system relays data transmitted/received between a Base Station (BS) and the MS, using the RS as illustrated in FIG. 1.

FIG. 1 illustrates a construction of a relay wireless communication system.

As illustrated in FIG. 1, the wireless communication system includes a BS 100, an RS 110, an MS1 120, and an MS2 130.

The BS 100 performs direct communication with the MS1 120 located in a service area.

The BS 100 performs communication with the MS2 130 located outside the service area, using the RS 110. That is, the BS 100 uses the RS 110 to provide a good wireless channel to an MS that has a poor channel state due to being either located outside a service area or located in a shadow area where a screening phenomenon is caused by a building and such.

When providing a relay service as above, a wireless communication system provides the relay service using a frame structure illustrated in FIG. 2.

FIG. 2 illustrates a frame structure for relay service in a wireless communication system according to the conventional art.

As illustrated in FIG. 2, a frame of the relay wireless communication system is composed of a Downlink (DL) subframe 220 and an Uplink (UL) subframe 230. Here, the DL subframe 220 is divided into a DL access zone 222 and a DL relay zone 224, and the UL subframe 230 is divided into a UL access zone 232 and a UL relay zone 234.

A DL subframe 220 of a BS frame 200 is composed of a DL access zone 222 and a DL relay zone 224. During the DL access zone 222, a BS transmits a signal to an MS connected through a direct link. During the DL relay zone 224, the BS transmits a signal to an RS.

A UL subframe 230 of the BS frame 200 is composed of a UL access zone 232 and a UL relay zone 234. During the UL access zone 232, the BS receives a UL signal from the MS. During the UL relay zone 234, the BS receives a UL signal from the RS.

A DL subframe 220 of an RS frame 210 is composed of a DL access zone 222 and a DL relay zone 224. During the DL access zone 222, an RS transmits a signal to an MS connected through a relay link. During the DL relay zone 224, the RS receives a signal from the BS. A Relay-Transmit/Receive Transition Gap (R-TTG) 260 is an Orthogonal Frequency Division Multiplexing (OFDM) symbol overhead for operation transition of the RS that exists between the DL access zone 222 and DL relay zone 224 of the DL subframe 220.

A UL subframe 230 of the RS frame 210 is composed of a UL access zone 232 and a UL relay zone 234. During the UL access zone 232, the RS receives a UL signal from the MS. During the UL relay zone 234, the RS transmits a UL signal to the BS. A Relay-Receive/Transmit Transition Gap (R-RTG) 280 is an OFDM symbol overhead for operation transition of the RS that exists between the UL access zone 232 and UL relay zone 234 of the UL subframe 230.

A Transmit/Receive Transition Gap (TTG) 240 exists between the DL subframe 220 and UL subframe 230 of the BS frame 200. The BS makes the transition from a transmit mode to a receive mode during the TTG 240.

An idle time (Idle_Time) 270 exists between the DL subframe 220 and UL subframe 230 of the RS frame 210. The idle time (Idle_Time) 270 is set for the RS frame 210 to be in synchronization with the BS frame 200. During the idle time (Idle_Time) 270, the RS does not make an operation transition. Also, during the Idle-Time 270, transmission/reception of data does not occur.

When providing a relay service as above, the RS frame 210 includes the overheads (i.e., the R-TTG and the R-RTG) for operation transition within the DL subframe 220 and the UL subframe 230. Thus, there is a problem because the operation transition gaps of the RS frame 210 lead to the degradation of a data transmission efficiency of a system.

SUMMARY OF THE INVENTION

An aspect of the present invention is to substantially solve at least the above problems and/or disadvantages and to provide at least the advantages below. Accordingly, one aspect of the present invention is to provide an apparatus and method for supporting a relay service in a relay wireless communication system.

Another aspect of the present invention is to provide a method and apparatus for configuring a frame structure and supporting a relay service in a relay wireless communication system.

Another aspect of the present invention is to provide an apparatus and method for setting a time guard zone in a relay wireless communication system.

Another aspect of the present invention is to provide an apparatus and method for reducing an overhead caused by an operation transition gap of a Relay Station (RS) frame in a relay wireless communication system.

Another aspect of the present invention is to provide an apparatus and method for reducing an overhead caused by an operation transition gap as removing a Transmit/Receive Transition Gap (TTG) zone of an RS frame in a relay wireless communication system.

Yet another aspect of the present invention is to provide an apparatus and method for configuring an Uplink (UL) subframe of an RS frame out of synchronization with a UL subframe of a Base Station (BS) frame, thus reducing an overhead caused by an operation transition gap in a relay wireless communication system.

The above aspects are achieved by providing an apparatus and method for configuring a frame structure in a relay wireless communication system.

According to one aspect of the present invention, a method for RS operation in a relay wireless communication system is provided. The method includes identifying a signal delay time with an upper node. A transmission/reception operation transition time is determined through a negotiation with the upper node. An idle time is determined. An overhead caused by transmission/reception operation transition is determined based on a start time point of a Uplink (UL) subframe dependent on the signal delay time, the transmission/reception operation transition time information, and the idle time. And Communication is performed based on the overhead. The start time point of the UL subframe is set earlier than a start time point of a UL subframe of the upper node in consideration of the idle time. The idle time represents an interval existing between a Downlink (DL) subframe and UL subframe of an RS to avoid interference between a Mobile Station (MS) receiving a service from the upper node and an MS receiving a service from the RS.

According to another aspect of the present invention, a method for RS operation in a relay wireless communication system. The method includes identifying a signal delay time with an upper node. A length of a Cyclic Prefix (CP) of one Orthogonal Frequency Division Multiplexing (OFDM) symbol is determined to be used by an RS less than a length of a CP of one OFDM symbol used by the upper node. A transmission/reception operation transition time is determined through a negotiation with the upper node. An overhead caused by transmission/reception operation transition is determined using at least one of a length of an access zone dependent on the determined CP length, the transmission/reception operation transition information, and the signal delay time. And communication is performed considering the overhead.

According to another aspect of the present invention, an RS apparatus in a relay wireless communication system is provided. The apparatus includes a timing controller, a transmission unit, and a reception unit. The timing controller determines an overhead caused by a transmission/reception operation transition time determined through a negotiation with an upper node, and provides a timing signal dependent on the overhead. When transitioning to a transmit mode by the timing signal, the transmission unit generates a frame according to a frame configuration scheme and transmits the frame through an antenna. When transitioning to a receive mode by the timing signal, the reception unit detects and identifies a corresponding subframe in a frame received through the antenna. The timing controller provides a timing signal for a start time point of a UL subframe of the RS set to be earlier than a start time point of a UL subframe of an upper node in consideration of an idle time. The idle time represents an interval existing between a DL subframe and UL subframe of the RS in order to avoid interference between an MS receiving a service from the upper node and an MS receiving a service from the RS.

Other aspects, advantages, and salient features of the invention will become apparent to those skilled in the art from the following detailed description which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for supporting a selective suspend mode in a Universal Serial Bus (USB) composite network device. Herein, the selective suspend mode is supported in some of the devices of the composite network device in an idle mode. That is, the selective suspend mode is supported only in some of the devices in the idle mode, compared to the idle mode in which the entire composite network device operates in the idle mode.

A technology for reducing an overhead caused by an operation transition gap in a relay wireless communication system according to the present invention is described below.

The following description is made on the assumption that a wireless communication system uses a Time Division Duplexing (TDD) scheme. However, the present invention is identically applicable even when the wireless communication system uses other communication schemes such as a Frequency Division Duplexing (FDD) scheme.

In the following description, a two-hop wireless communication system is assumed. Accordingly, an upper node of a Relay Station (RS) represents a Base Station (BS), and a lower node of the RS represents a Mobile Station (MS). However, the present invention is identically applicable even to a three-hop or multi-hop wireless communication system. An upper node of an RS represents a BS or an upper RS, and a lower node of the RS represents an MS or a lower RS.

In the following description, a direct link MS represents an MS that receives a service from a BS, and a relay link MS represents an MS that receives a service from an RS.

Figure 1:
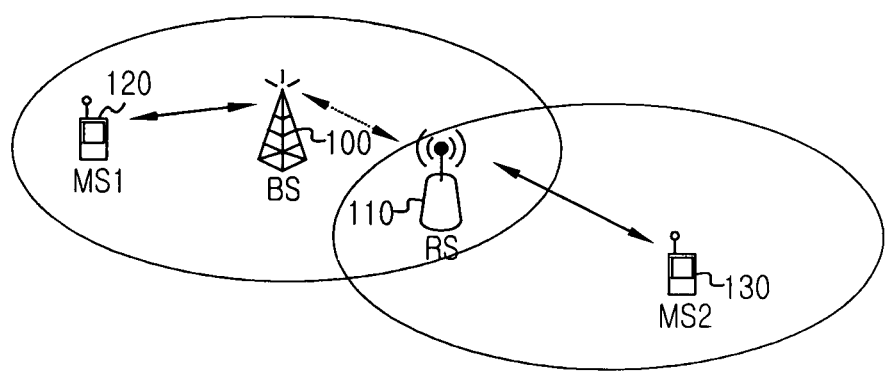
FIG. 1 illustrates a relay wireless communication system.
Figure 2:
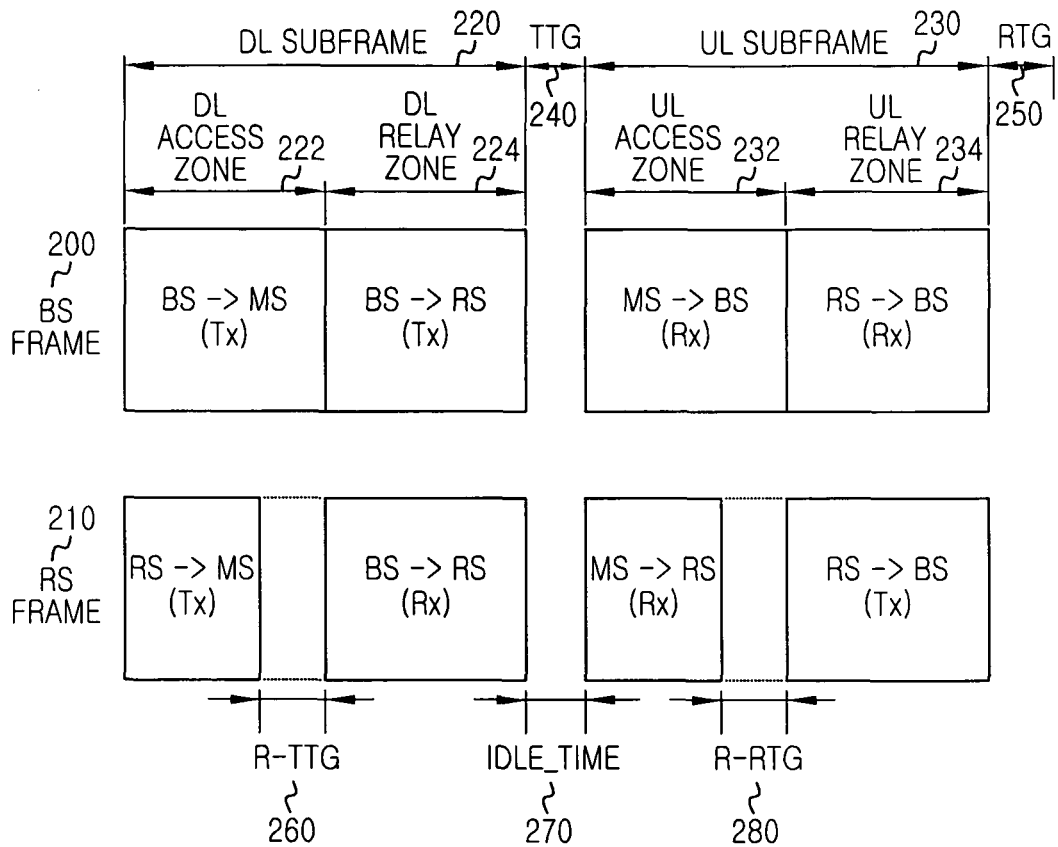
FIG. 2 illustrates a frame structure for relay service in a wireless communication system.
Figure 3:
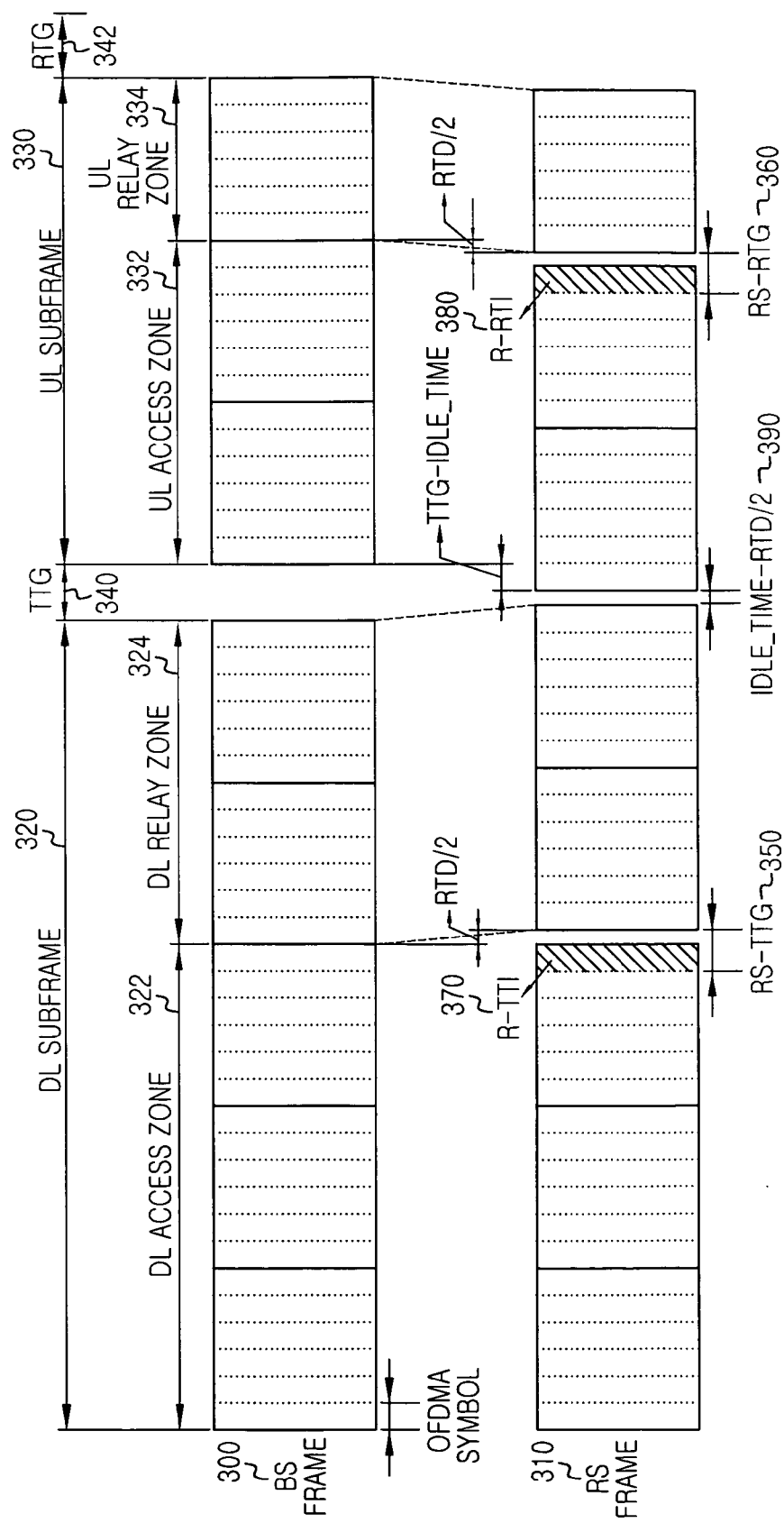
FIG. 3 illustrates a frame structure for relay service in a wireless communication system according to an embodiment of the present invention.

FIG. 3 illustrates a frame structure for relay service in a wireless communication system according to an embodiment of the present invention.

As illustrated in FIG. 3, a frame of the relay wireless communication system is composed of a Downlink (DL) subframe 320 and an Uplink (UL) subframe 330. The DL subframe 320 is divided into a DL access zone 322 and a DL relay zone 324. Also, the UL subframe 330 is divided into a UL access zone 332 and a UL relay zone 334.

A DL subframe 320 of a BS frame 300 is composed of a DL access zone 322 and a DL relay zone 324. During the DL access zone 322, a BS transmits a DL signal to a direct link MS. During the DL relay zone 324, the BS transmits a DL signal to an RS. At this time, even during the DL relay zone 324, the BS can transmit a DL signal to an MS connected through a direct link.

A UL subframe 330 of the BS frame 300 is composed of a UL access zone 332 and a UL relay zone 334. During the UL access zone 332, the BS receives a UL signal from a direct link MS. During the UL relay zone 334, the BS receives a UL signal from an RS. At this time, even during the UL relay zone 334, the BS can receive a UL signal from an MS connected through a direct link.

A Transmit/Receive Transition Gap (TTG) 340 for operation transition of the BS exists between the DL subframe 320 and the UL subframe 330 of the BS frame 300. Also, a Receive/Transmit Transition Gap (RTG) 342 for operation transition of the BS exists between frames of the BS frame 300.

A DL subframe 320 of an RS frame 310 is composed of a DL access zone 322 and a DL relay zone 324. During the DL access zone 322, an RS transmits a DL signal to a relay link MS. During the DL relay zone 324, the RS receives a DL signal from a BS.

An RS-Transmit/Receive Transition Gap (RS-TTG) 350 is a time zone for operation transition of the RS that exists between the DL access zone 322 and DL relay zone 324 of the DL subframe 320. Accordingly, a Relay-Transmit/Receive Transition Interval (R-TTI) 370, which is an Orthogonal Frequency Division Multiplexing (OFDM) symbol overhead of the RS frame 310 that is dependent on the RS-TTG 350, exists between the DL access zone 322 and the DL relay zone 324. For example, the R-TTI 370 can be expressed according to Equation 1 below. If the R-TTI 370 is set as one or more OFDM symbols, the R-TTI 370 can be included in either the DL access zone 322 or DL relay zone 324 of the DL subframe 320.

$$R\text{-}TTI = \begin{cases} 0 & \text{if } RTD/2 \geq RSTTG \\ \text{OFDM\_SymbolUnit}(RSTTG - RTD/2) & \text{if } RTD/2 < RSTTG \end{cases} \quad \text{[Eqn. 1]}$$

$$\text{OFDM\_SymbolUnit}(x) = \lceil z / OFDMSymboltime \rceil$$

In Equation 1, the 'R-TTI' 370 represents a DL overhead of an OFDM symbol unit in the DL subframe 320 of the RS frame 310, the 'Round-Trip Delay (RTD)' represents a signal delay time between a BS and an RS, the OFDMSymboltime represents one OFDM symbol duration in time axis, and the 'RSTTG' represents a time zone necessary for making the transition from a transmit mode to a receive mode in an actual physical device of the RS. At this time, the 'RSTTG' corresponds to a physical capability of the RS.

Generally, the 'RSTTG' has a value greater than the 'RTD/2' and less than one OFDM symbol. Accordingly, if the 'RTD/2' is less than the 'RSTTG' (RTD/2<RSTTG), the R-TTI 370 has a value of '1' in Equation 1. That is, the R-TTI 370 has a size of one OFDM symbol.

The 'RSTTG' of Equation 1 is a value different from the RS-TTG 350. In detail, the RS-TTG 350 represents a time difference between the DL access zone 322 and DL relay zone 324 of the DL subframe 320, while the 'RSTTG' represents the time zone for making the transition from the transmit mode to the receive mode in the actual physical device of the RS. In other words, the RS makes the operation transition from the transmit mode to the receive mode during the 'RSTTG' time at the RS-TTG 350 interval of the RS frame 310. Accordingly, the RS-TTG 350 has a value equal to or greater than the 'RSTTG'.

A UL subframe 330 of the RS frame 310 is composed of a UL access zone 332 and a UL relay zone 334. During the UL access zone 332, the RS receives a UL signal from a relay link MS. During the UL relay zone 334, the RS transmits a UL signal to a BS. An RS-Receive/Transmit Transition Gap (RS-RTG) 360, a time zone for operation transition of the RS, exists between the UL access zone 332 and UL relay zone 334 of the UL subframe 330. Accordingly, a Relay-Receive/Transmit Transition Interval (R-RTI) 380, an OFDM symbol overhead of the RS frame 310 dependent on the RS-RTG 360, exists between the UL access zone 332 and the UL relay zone 334 of the UL subframe 330. For example, when the R-RTI 380 is set as one or more OFDM symbols, the R-RTI 380 can be included in either the UL access zone 332 or UL relay zone 334 of the UL subframe 330.

In the RS frame 310, during the DL relay zone 324 of the DL subframe 320, the RS receives a DL signal from a BS, and during the UL access zone 332 of the UL subframe 330, the RS receives a UL signal from an MS. Accordingly, the RS frame 310 does not need as much time as the TTG 340 for operation transition between the DL subframe 320 and UL subframe 330 of the RS frame 310. However, the RS frame 310 needs as much time as an idle time (Idle_Time) between the DL subframe 320 and the UL subframe 330 of the RS frame 310 in order to avoid interference between a direct link MS and a relay link MS.

When the RS frame 310 needs the idle time (Idle_Time), the UL access zone 332 of the UL frame 330 of the RS frame 310 can be shifted forward (earlier) by 'TTG-Idle_Time' time.

During the UL relay zone 334 of the UL subframe 330, the RS transmits a UL signal to a BS. Accordingly, the UL relay zone 334 of the UL subframe 330 of the RS frame 310 can be shifted forward (earlier) by 'RTD/2' time comparison to the UL relay zone 334 of the UL subframe 330 of the BS frame 300.

That is, a time zone by as much as 'TTG-Idle_Time'-'RTD/2' is generated between the UL access zone 332 and UL relay zone 334 of the UL subframe 330 of the RS frame 310. Accordingly, the R-RTI 380 can be expressed according to Equation 2 below.

$$R\text{-}RTI = \begin{cases} 0 & \text{if } TTG - \text{Idle\_time} - RTD/2 \geq RSRTG \\ \text{OFDM\_SymbolUnit}(RSRTG + \text{Idle\_time} + RTD/2 - TTG) & \text{if } TTG - \text{Idle\_time} - RTD/2 < RSRTG \end{cases} \quad [\text{Eqn. 2}]$$

$$\text{OFDM\_SymbolUnit}(x) = \lceil x / OFDMSymboltime \rceil$$

In Equation 2, the 'R-RTI' corresponds to R-RTI 380 and represents an overhead of an OFDM symbol unit in the UL subframe 330 of the RS frame 310. The 'RTD' represents a signal delay time between a BS and an RS, the 'Idle'_time represents a necessary time value between the DL subframe 320 and UL subframe 330 of the RS frame 310 in order to avoid interference between a direct link MS and a relay link MS, the OFDMSymboltime represents one OFDM symbol duration in time axis, and the 'RSRTG' represents a time zone necessary for making the transition from a receive mode to a transmit mode in an actual physical device of the RS. At this time, the 'RSRTG' corresponds to a physical capability of the RS.

The 'RSRTG' of Equation 2 is a value different from the RS-RTG 360. In detail, the RS-RTG 360 represents a time difference between the UL access zone 332 and UL relay zone 334 of the UL subframe 330 of the RS frame 310, while the 'RSRTG' represents the time zone for making the transition from the receive mode to the transmit mode in the actual physical device of the RS. In other words, the RS makes the operation transition from the receive mode to the transmit mode during the 'RSRTG' time during the RS-RTG 360 interval of the RS frame 310. Accordingly, the RS-RTG 360 has a value equal to or greater than the 'RSRTG'.

In general, the TTG 340 has one or more OFDM symbol values. Also, assuming that a distance between a BS and an RS is equal to 3 km to 5 km, the 'RTD' has a value of about 1/10 to 1/8 of one OFDM symbol, and the RS-RTG 360 has a size of 1/2 or less of the OFDM symbol. Also, the idle time (Idle_Time) can be determined depending on the maximum cell coverage information of the BS and cell coverage information of the RS. For example, the idle time (Idle_Time) has a value of '10 μs' to '20 μs'. Also, the idle time (Idle_Time) can be set as a value less than the TTG 340.

Accordingly, the R-RTI 380 generally has a value of '0' in Equation 2. That is, the RS frame 310 does not need the R-RTI 380.

However, when the idle time (Idle_Time) has a value equal to or a little less than the TTG 340, the 'TTG-Idle_Time-RTD/2' is less than the 'RSRTG'. Accordingly, the R-RTI 380 has a value of '1' in Equation 2. That is, the R-RTI 380 has a size of one OFDM symbol. At this time, the R-RTI 380 can have a value of '1' or more by the 'RSRTG'. However, it does not occur that the R-RTI 380 has the value of '1' or more because the 'RSRTG' generally is less than one OFDM symbol.

The following description is made for an operation method of a BS for transmitting zone information enabling an RS to make the transition of transmission/reception operation in a relay wireless communication system.

Figure 4:
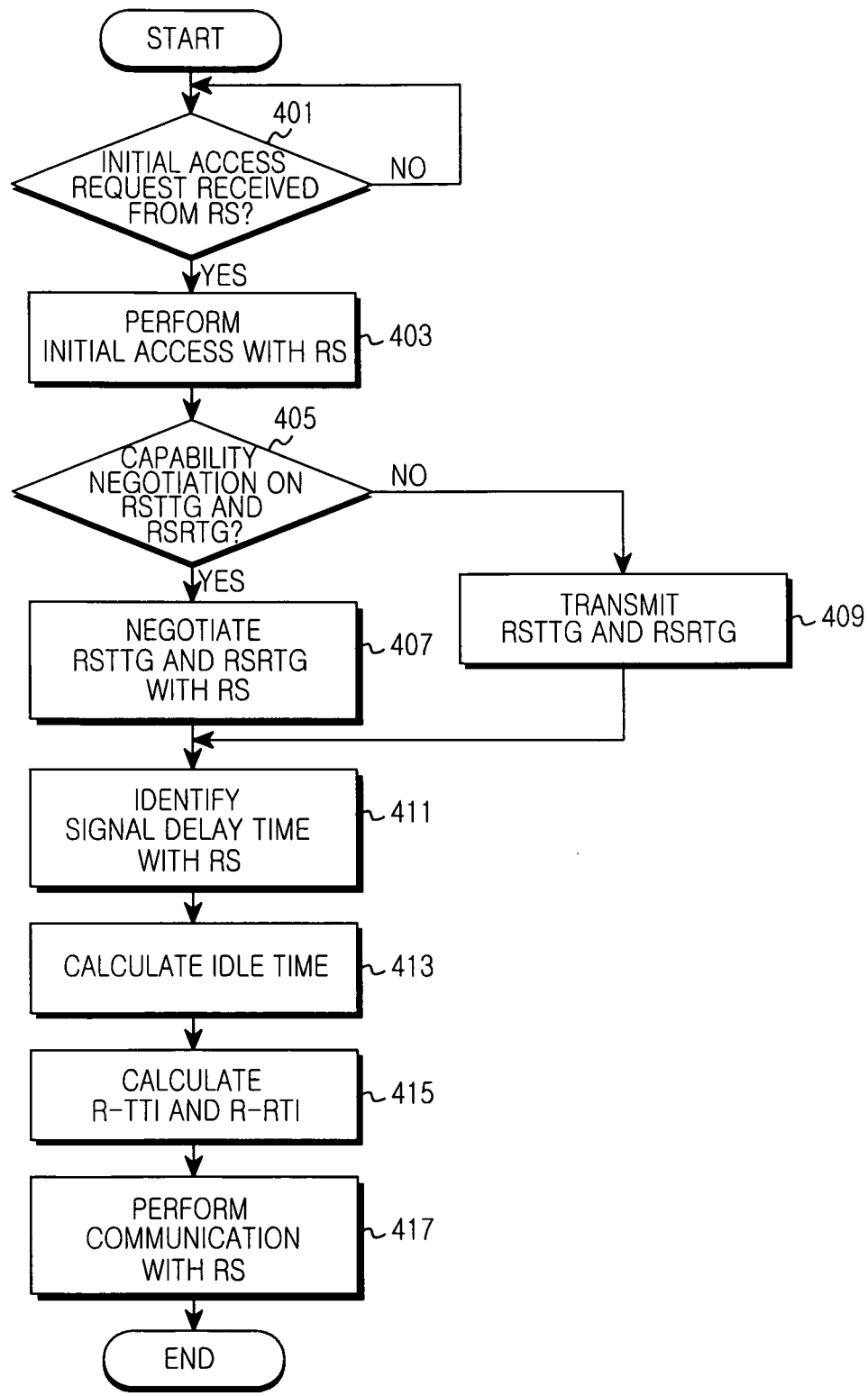
FIG. 4 illustrates a procedure of a Base Station (BS) in a relay wireless communication system according to an embodiment of the present invention.

FIG. 4 illustrates an operation procedure of a BS in a relay wireless communication system according to an exemplary embodiment of the present invention.

Referring to FIG. 4, in step 401, the BS identifies if an initial access request message is received from an RS.

If the initial access request message is received from the RS, the BS proceeds to step 403 and performs initial access with the RS.

After that, the BS proceeds to step 405 and judges whether to negotiate an RSTTG and an RSRTG with the RS.

When it is judged to negotiate the RSTTG and RSRTG with the RS, the BS proceeds to step 407 and negotiates the RSTTG and RSRTG with the RS. At this time, the BS negotiates the RSTTG and RSRTG through a capability negotiation with the RS. Also, the BS performs the capability negotiation with the RS during initial access performance with the RS or after the initial access performance. The BS can set a different RSTTG and RSRTG to each RS. For example, when the BS negotiates an RSTTG and an RSRTG with the RS, the BS identifies the maximum values of the RSTTG and RSRTG, and an RSTTG and RSRTG desired by the RS. Then, the BS determines the RSTTG and RSRTG of the RS considering the RSTTG and RSRTG desired by the RS and transmits the determined RSTTG and RSRTG of the RS to the RS. In another example, the BS identifies the maximum values of the RSTTG and RSRTG, and the RSTTG and RSRTG desired by the RS. Then, the BS transmits a response signal including information on the acceptance or non-acceptance of the RSTTG and RSRTG desired by the RS, to the RS. At this time, the BS determines the RSTTG and RSRTG less than or equal to the maximum values of the RSTTG and RSRTG desired by the RS. Here, the maximum values of the RSTTG and RSRTG can be set as system information and previously known by the BS and RS, or can be determined by the BS and informed the RS through broadcasting information. The broadcasting information includes a Downlink Channel Descriptor (DCD) message.

After negotiating the RSTTG and RSRTG with the RS in step 407, the BS proceeds to step 411 and identifies a signal delay time with the RS. For example, the BS identifies a signal delay time acquired from an initial access process or random access process with the RS.

Alternatively, when it is judged not to negotiate the RSTTG and RSRTG with the RS in step 405, the BS proceeds to step 409 and determines and transmits an RSTTG and RSRTG to the RS. For example, during initial access performance or after the initial access performance, the BS transmits the determined RSTTG and RSRTG to the RS using broadcasting information. In another example, before the initial access performance, the BS may transmit the determined RSTTG and RSRTG to the RS using broadcasting information.

After transmitting the RSTTG and RSRTG to the RS in step 409, the BS proceeds to step 411 and identifies a signal delay time with the RS. For example, the BS identifies a signal delay time acquired from the initial access process or random access process with the RS.

Next, the BS proceeds to step 413 and determines an idle time value (Idle_Time) between a DL subframe and UL subframe of an RS frame to avoid interference between a direct link MS (i.e., an accessed MS) and a relay link MS. For example, the BS determines the idle time value (Idle_Time) considering its own cell coverage information and cell coverage information of an RS. At this time, the BS can acquire the cell coverage information of the RS from the RS. In another example, the BS may determine the idle time value (Idle_Time) considering lengths of Cyclic Prefixes (CPs) of a signal of the direct link MS and a signal of the relay link MS.

After determining the idle time value (Idle_Time), the BS proceeds to step 415 and calculates a DL overhead (i.e., an R-TTI) and a UL overhead (i.e., an R-RTI) of the RS using the RSTTG and RSRTG information, the idle time value (Idle_Time), and the signal delay time with the RS. That is, the BS calculates the DL overhead and UL overhead of the RS so as to be in synchronization with the RS. For example, the BS can calculate the R-TTI and R-RTI using Equations 1 and 2.

After calculating the UL overhead and DL overhead of the RS, the BS proceeds to step 417 and performs communication with the RS considering the DL overhead and UL overhead of the RS.

After that, the BS terminates the procedure according to an embodiment of the present invention.

In the aforementioned embodiment, upon initial access with an RS, a BS either negotiates RSTTG and RSRTG information with the RS or determines and transmits the RSTTG and RSRTG information to the RS.

In another embodiment, in an access state with an RS in addition to upon initial access with the RS, a BS may either negotiate RSTTG and RSRTG information with the RS or determine and transmit the RSTTG and RSRTG information to the RS. That is, when the RS provides a relay service in access with the BS, if a signal delay time by a wireless channel is changed, the BS may either again negotiate the RSTTG and RSRTG information with the RS or generate and transmit the RSTTG and RSRTG information to the RS.

In the aforementioned embodiment, a BS determines an idle time of an RS frame. Then, though not illustrated, the BS transmits the determined idle time information to the RS. For example, the BS transmits broadcasting information or, in an initial access process, transmits the idle time information to the RS.

In another embodiment, an idle time can be defined as a fixed value of a system. A BS does not transmit the idle time information to an RS. However, when the RS is not aware of the fixed idle time, the BS may transmit broadcasting information or, in an initial access process, transmit the idle time information to the RS.

As described above, when a BS determines an idle time, the BS may either calculate the idle time that is identically applicable to all RSs or calculate the idle time dependent on a characteristic of each RS.

The following description is made for a process of an RS for setting an R-TTI and an R-RTI to reduce an overhead caused by an operation transition gap by removing a TTG of an RS frame 310.

Figure 5:
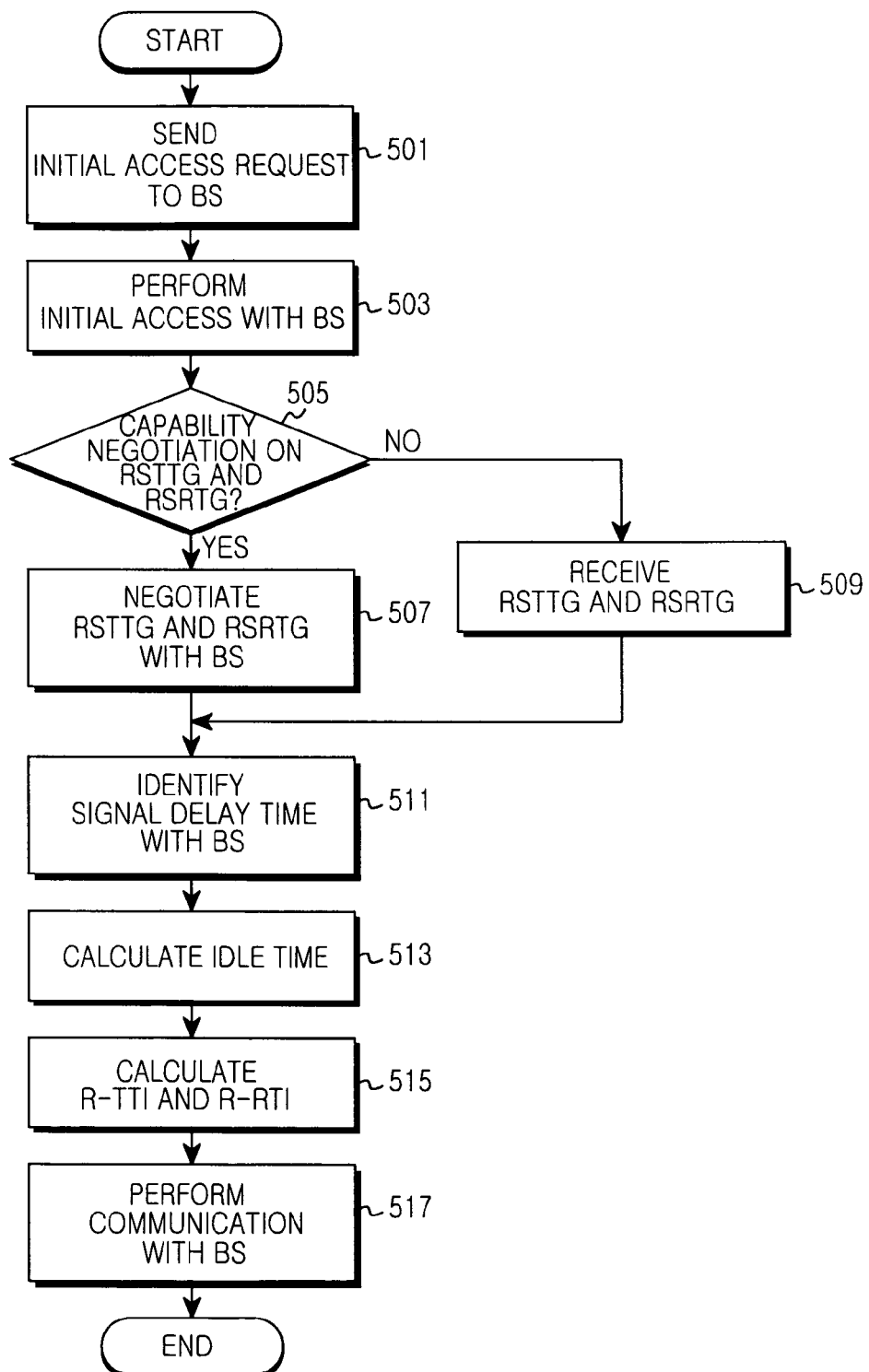
FIG. 5 illustrates a procedure of a Relay Station (RS) in a relay wireless communication system according to an embodiment of the present invention.

FIG. 5 illustrates a procedure of an RS in a relay wireless communication system according to an embodiment of the present invention.

Referring to FIG. 5, in step 501, the RS sends an initial access request to a BS.

After sending the initial access request to the BS, the RS proceeds to step 503 and performs an initial access process with the BS.

After that, the BS proceeds to step 505 and judges whether to negotiate an RSTTG and an RSRTG with the BS.

When it is judged to negotiate the RSTTG and RSRTG with the BS in step 505, the RS proceeds to step 507 and negotiates the RSTTG and RSRTG with the BS. At this time, the RS negotiates the RSTTG and RSRTG through a capability negotiation with the BS. Also, during initial access performance with the BS or after the initial access performance, the RS performs the capability negotiation with the BS. For example, when the RS negotiates the RSTTG and RSRTG, the RS determines and transmits its own preferred RSTTG and RSRTG to the BS. Then, the RS identifies an RSTTG and an RSRTG through an RSTTG and RSRTG response signal provided from the BS. In another example, the RS determines and transmits its own preferred RSTTG and RSRTG to the BS. Then, the RS receives an RSTTG and an RSRTG determined by the BS, from the BS. At this time, the RS determines its own preferred RSTTG and RSRTG considering the maximum values of an RSTTG and an RSRTG. Here, the maximum values of the RSTTG and RSRTG can either be set as system information or be provided from the BS through broadcasting information.

After negotiating the RSTTG and RSRTG with the BS in step 507, the RS proceeds to step 511 and identifies a signal delay time with the BS. For example, the RS identifies a signal delay time acquired from an initial access process or random access process with the BS.

Alternatively, when it is judged not to negotiate the RSTTG and RSRTG with the BS in step 505, the RS proceeds to step 509 and receives an RSTTG and an RSRTG from the BS. For example, during initial access performance with the BS or after the initial access performance, the RS receives the RSTTG and RSRTG information broadcasted in the BS. In another example, before the initial access performance with the BS, the RS may identify the RSTTG and RSRTG information through broadcasting information of the BS.

After receiving the RSTTG and RSRTG information from the BS in step 509, the RS proceeds to step 511 and identifies a signal delay time with the BS. For example, the RS identifies a signal delay time acquired from the initial access process or random access process with the BS.

After that, the RS proceeds to step 513 and identifies an idle time value (Idle_Time) for setting between a DL subframe 320 and UL subframe 330 of an RS frame to avoid interference between a direct link MS (i.e., an accessed MS) and a relay link MS. For example, the RS identifies the idle time value (Idle_Time) through broadcasting information of a BS. In another example, the RS may receive the idle time value (Idle_Time) from the BS in an initial access process with the BS. In another example, the RS may identify the idle time value (Idle_Time) set as a fixed value in a system. Although not illustrated, the RS may transmit the identified idle time information (Idle_Time) to an MS.

After identifying the idle time value (Idle_Time), the RS proceeds to step 515 and calculates a DL overhead (i.e., an R-TTI) and a UL overhead (i.e., an R-RTI) using the RSTTG and RSRTG information, the idle time value (Idle_Time), and the signal delay time with the BS. For example, the RS calculates the R-TTI and R-RTI using Equations 1 and 2. At this time, the RS frame 310 needs a time zone as much as an idle time (Idle_Time), which is set as a value less than a TTG 340 zone, between the DL subframe 320 and UL subframe 330. Accordingly, the RS may not set a separate R-RTI in Equation 2.

After calculating the DL overhead and UL overhead, the RS proceeds to step 517 and performs communication with the BS in consideration of the DL overhead and UL overhead.

After that, the RS terminates the procedure according to an embodiment of the present invention.

In the aforementioned embodiment, an RS either negotiates R-TTI and R-RTI information with a BS or calculates the R-TTI and R-RTI information using RSTTG and RSRTG information provided from the BS.

In another embodiment, an RS may identify an R-TTI and an R-RTI calculated and transmitted by a BS for each RS.

In the aforementioned embodiment, an RS frame 310 configures a UL subframe out of synchronization with a UL subframe of a BS subframe 300. That is, the RS frame 310 uses only an idle time zone without using a TTG. Accordingly, the RS frame 310 can reduce an overhead caused by an R-RTI.

In a embodiment, an RS frame 310 can reduce an overhead caused by an R-TTI and an R-RTI by controlling a cyclic prefix (CP) value of an OFDM symbol of an RS.

Figure 6:
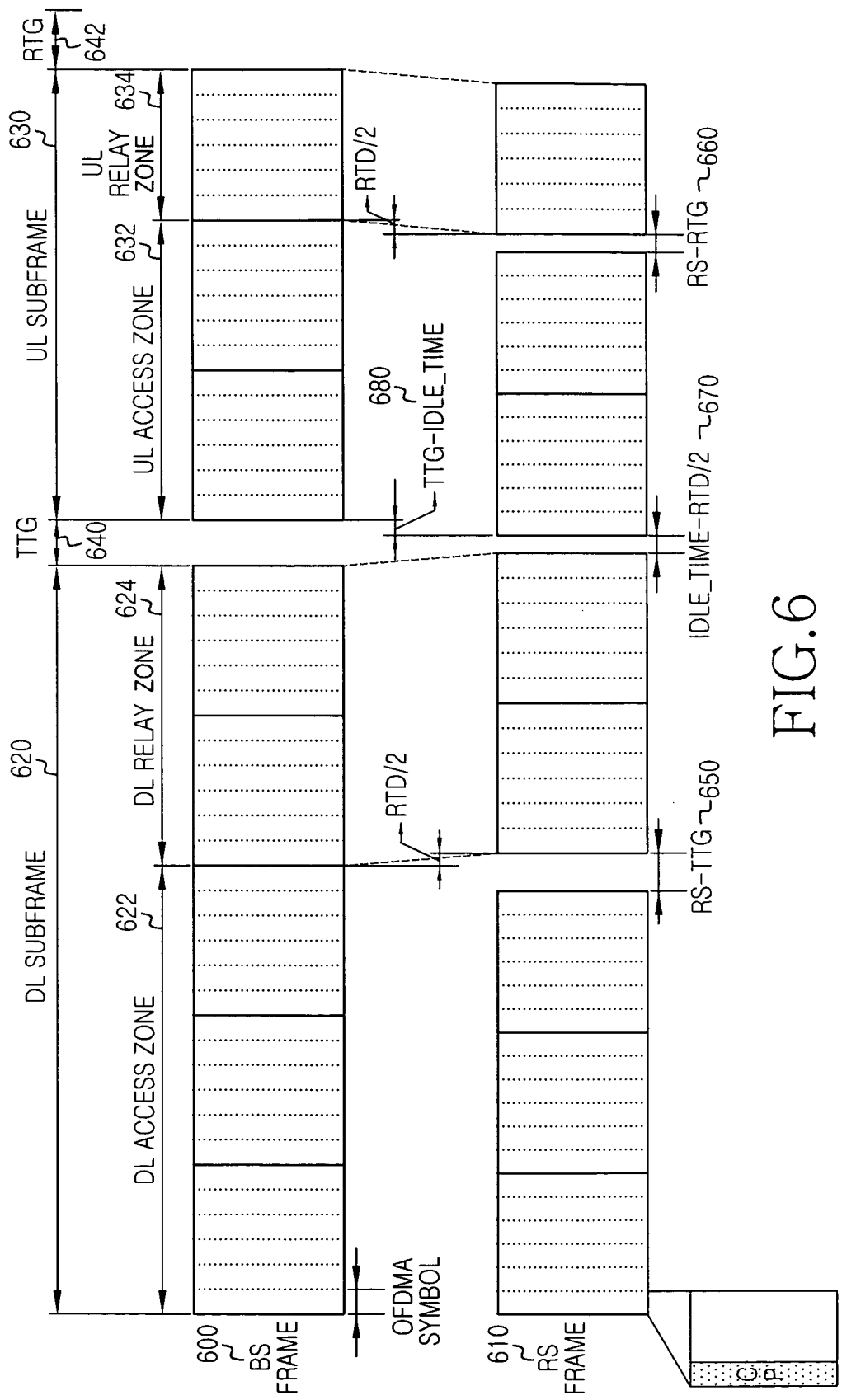
FIG. 6 illustrates a frame structure for relay service in a wireless communication system according to an embodiment of the present invention.

FIG. 6 illustrates a frame structure for relay service in a wireless communication system according to another embodiment of the present invention.

As illustrated in FIG. 6, a frame of the relay wireless communication system is composed of a DL subframe 620 and a UL subframe 630. Here, the DL subframe 620 is divided into a DL access zone 622 and a DL relay zone 624. Also, the UL subframe 630 is divided into a UL access zone 632 and a UL relay zone 634.

A DL subframe 620 of a BS frame 600 is composed of a DL access zone 622 and a DL relay zone 624. During the DL access zone 622, a BS transmits a DL signal to a direct link MS. During the DL relay zone 624, the BS transmits a DL signal to an RS.

A UL subframe 630 of the BS frame 600 is composed of a UL access zone 632 and a UL relay zone 634. During the UL access zone 632, the BS receives a UL signal from a direct link MS. During the UL relay zone 634, the BS receives a UL signal from an RS.

A TTG 640 for operation transition of the BS exists between the DL subframe 620 and UL subframe 630 of the BS frame 600. Also, an RTG 642 for operation transition of the BS exists between frames of the BS frame 600.

A DL subframe 620 of an RS frame 610 is composed of a DL access zone 622 and a DL relay zone 624. During the DL access zone 622, an RS transmits a DL signal to a relay link MS. During the DL relay zone 624, the RS receives a DL signal from the BS. An RS-TTG 650 is a time zone for operation transition of the RS that exists between the DL access zone 622 and DL relay zone 624 of the DL subframe 620.

A UL subframe 630 of the RS frame 610 is composed of a UL access zone 632 and a UL relay zone 634. During the UL access zone 632, the RS receives a UL signal from a relay link MS. During the UL relay zone 334, the RS transmits a UL signal to the BS. An RS-RTG 660 is a time zone for operation transition of the RS that exists between the UL access zone 632 and UL relay zone 634 of the UL subframe 630.

At this time, the RS can set a length of a CP included in an OFDM symbol of the DL access zone 622 of the DL subframe 620 less than a length of a CP of a BS, thus shortening a length of the DL access zone 622. Accordingly, the RS can secure the RS-TTG 650 and RS-RTG 660, which are the time zones for transmission/reception operation transition of the RS, using the shortened length of the DL access zone 622.

For example, when a length of a CP of one OFDM symbol is set as ⅛ of one OFDM symbol in the BS frame 600, and it is assumed that a length of one OFDM symbol excluding the CP is equal to '100 µs', a length of one OFDM symbol is equal to '112.5 µs'. Accordingly, assuming that the DL access zone 622 is composed of eighteen OFDM symbols, a size of the DL access zone 622 of the DL subframe 620 of the BS frame 600 is equal to '2025 µs'.

Alternatively, when a length of a CP of one OFDM symbol is set as 1/16 of one OFDM symbol in the RS frame 610, and it is assumed that a length of one OFDM symbol excluding the CP is equal to '100 µs', a length of one OFDM symbol is equal to '106.25 µs'. Accordingly, assuming that the DL access zone 622 is composed of eighteen OFDM symbols, a size of the DL access zone 622 of the DL subframe 620 of the RS frame 610 is equal to '1912.5 µs'. That is, when a start time of the DL frame 620 of the RS frame 610 is identical with a start time of the DL subframe 620 of the BS frame 600, the DL access zone 622 of the DL subframe 620 of the RS frame 610 ends earlier by '112.5 µs' than the DL access zone 622 of the DL subframe 620 of the BS frame 600.

During the DL relay zone 624 of the DL subframe 620, the RS receives a DL signal from a BS. Accordingly, the DL relay zone 624 of the DL subframe 620 of the RS frame 610 can be shifted backward (later) by 'RTD/2' time compared to the DL relay zone 624 of the DL subframe 620 of the BS frame 600.

Accordingly, a time zone with a duration up to ('112.5 µs'+RTD/2) is generated between the DL access zone 622 and DL relay zone 624 of the DL subframe 620 of the RS frame 610.

In general, an RSTTG for an RS to make the transition from a transmit mode to a receive mode has a value of '50 µs' or less of an OFDM symbol. Accordingly, the RS can transition during the time zone existing between the DL access zone 622 and DL relay zone 624 of the DL subframe 620 without a separate R-TTI.

A length of a CP included in an OFDM symbol of the DL relay zone 624 of the DL subframe 620 of the RS frame 610 becomes identical with a length of a CP of a BS.

Regarding an R-RTI, like the R-TTI, the RS sets a length of a CP of an OFDM symbol of the UL access zone 632 of the UL subframe 630 of the RS frame 610 less than a length of a CP of a BS. The UL access zone 632 of the UL subframe 630 of the RS frame 610 is configured less than the UL access zone 632 of the UL subframe 630 of the BS frame 600. Accordingly, an RSRTG, which is a time zone of a constant duration, is generated between the UL access zone 632 and UL relay zone 634 of the UL subframe 630 of the RS frame 610.

Generally, the RSRTG has a value of '50 µs' or less of an OFDM symbol. Accordingly, the RS can transition during the time zone existing between the UL access zone 632 and UL relay zone 634 of the UL subframe 630 without a separate R-RTI.

At this time, a length of a CP included in an OFDM symbol of the UL relay zone 634 of the UL subframe 630 of the RS frame 610 becomes identical with a length of a CP of a BS. Here, a TTG 640 or idle time (Idle_Time) may exist between the DL subframe 620 and UL subframe 630 of the RS frame 610.

In other words, the R-TTI can be expressed according to Equation 3 below.

$$R\text{-}TTI = \begin{cases} 0 & \text{if } RTD/2 + \alpha N \geq RSTTG \\ \text{OFDM\_SymbolUnit}(RSTTG - RTD/2 - \alpha N) & \text{if } RTD/2 + \alpha N < RSTTG \end{cases} \quad [\text{Eqn. 3}]$$

$$\text{OFDM\_SymbolUnit}(x) = \lceil x / OFDMSymboltime \rceil$$

In Equation 3, the 'R-TTI' represents an overhead of an OFDM symbol unit in the DL subframe 620 of the RS frame 610, the 'RTD' represents a signal delay time between a BS and an RS, the 'RSTTG' represents a time zone necessary for an actual physical device of the RS to make the transition from a transmit mode to a receive mode, the 'α' represents a time difference between a length of a CP of an OFDM symbol for the DL access zone 622 of the BS frame 600 and a length of a CP of an OFDM symbol for the DL access zone 622 of the RS frame 610, the OFDMSymboltime represents one OFDM symbol duration in time axis, and the 'N' represents the number of OFDM symbols constituting the DL access zones 622 of the BS frame 600 and RS frame 610. Here, the 'RSTTG' corresponds to a physical capability of the RS.

When the idle time (Idle_Time) exists between the DL subframe 620 and UL subframe 630 of the RS frame 610, the R-RTI can be expressed according to Equation 4 below.

610, the 'RTD' represents a signal delay time between a BS and an RS, the 'RSRTG' represents a time necessary for making the transition from a receive mode to a transmit mode in an actual physical device of the RS, the 'α' represents a time difference between a length of a CP of an OFDM symbol for the UL access zone 632 of the BS frame 600 and a length of a CP of an OFDM symbol for the UL access zone 632 of the RS frame 610, the OFDMSymboltime represents one OFDM symbol duration in time axis, and the 'N' represents the number of OFDM symbols constituting the UL access zones 632 of the BS frame 600 and RS frame 610. At this time, the 'RSRTG' corresponds to a physical capability of the RS.

The following description is made for a process of an RS for setting an R-TTI and an R-RTI to reduce an overhead caused by an operation transition gap by controlling lengths of CPs of DL and UL access zones 622 and 632 of an RS frame 610.

$$R\text{-}RTI = \begin{cases} 0 & \text{if } TTG - \text{Idle\_time} - RTD/2 + \alpha N \geq RSRTG \\ \text{OFDM\_SymbolUnit}(RSRTG + \text{Idle\_time} + RTD/2 - TTG - \alpha N) & \text{if } TTG - \text{Idle\_time} - RTD/2 + \alpha N < RSRTG \end{cases} \quad [\text{Eqn. 4}]$$

$$OFDMSymbolUnit(x) = \lceil x / OFDMSymboltime \rceil$$

In Equation 4, the 'R-RTI' represents an overhead of an OFDM symbol unit in the UL subframe 630 of the RS frame 610, the 'RTD' represents a signal delay time between a BS and an RS, the 'RSRTG' represents a time zone necessary for an actual physical device of the RS to make the transition from a receive mode to a transmit mode, the 'α' represents a time difference between a length of a CP of an OFDM symbol for the UL access zone 632 of the BS frame 600 and a length of a CP of an OFDM symbol for the UL access zone 632 of the RS frame 610, the 'N' represents the number of OFDM symbols constituting the UL access zones 632 of the BS frame 600 and RS frame 610, the OFDMSymboltime represents one OFDM symbol duration in time axis, and the 'Idle_time' represents a necessary time value between the DL subframe 620 and UL subframe 630 of the RS frame 610 in order to avoid interference between a direct link MS and a relay link MS. At this time, the 'RSRTG' corresponds to a physical capability of the RS.

When the TTG 640 exists between the DL subframe 620 and UL subframe 630 of the RS frame 610, the R-RTI can be expressed according to Equation 5 below.

Figure 7:
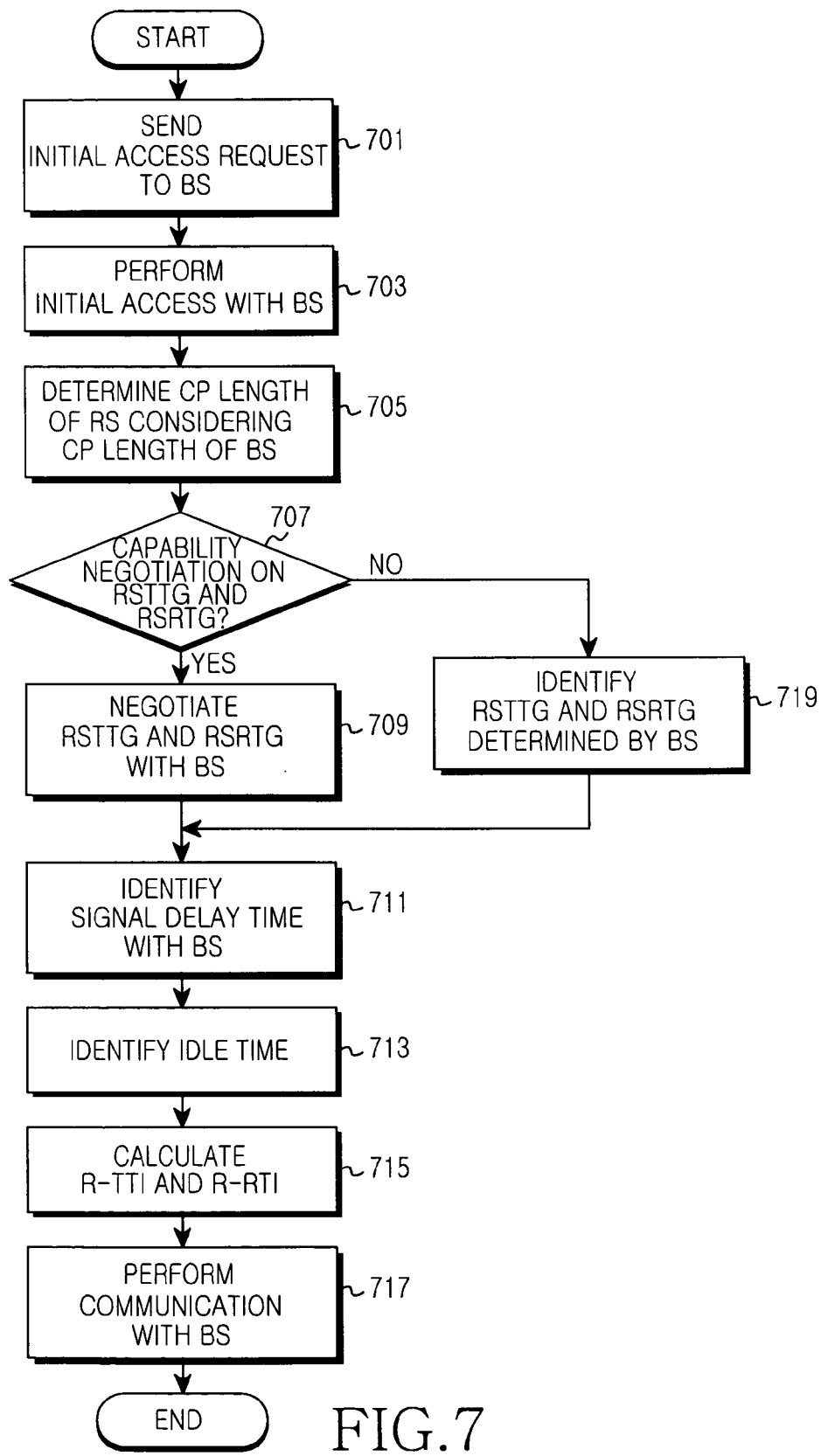
FIG. 7 illustrates a procedure of an RS in a relay wireless communication system according to an embodiment of the present invention.

FIG. 7 illustrates a procedure of an RS in a relay wireless communication system according to another embodiment of the present invention.

Referring to FIG. 7, in step 701, the RS sends an initial access request to a BS.

After sending the initial access request to the BS, the RS proceeds to step 703 and performs an initial access process with the BS.

After that, the RS proceeds to step 705 and determines a length of a CP of its own access zone considering a length of a CP of the BS. For example, when the length of the CP of the BS is equal to ⅛ of one OFDM symbol, the RS determines a length of a CP of an access zone as 1/16 of one OFDM symbol. At this time, upon initial access to the BS, the RS can identify the length of the CP of the BS through a superframe header provided from the BS. Although not illustrated, the RS transmits the determined CP length information to an MS.

After determining the length of the CP of the access zone, the RS proceeds to step 707 and judges whether to negotiate an RSTTG and an RSRTG with the BS.

When it is judged to negotiate the RSTTG and RSRTG with the BS, the RS proceeds to step 709 and negotiates the $$R\text{-}RTI = \begin{cases} 0 & \text{if } \alpha N - RTD/2 \geq RSRTG \\ \text{OFDM\_SymbolUnit}(RSRTG + RTD/2 - \alpha N) & \text{if } \alpha N - RTD/2 < RSRTG \end{cases} \quad [\text{Eqn. 5}]$$

$$\text{OFDM\_SymbolUnit}(x) = \lceil x / OFDMSymboltime \rceil$$

In Equation 5, the 'R-RTI' represents an overhead of an OFDM symbol unit of the UL subframe 630 of the RS frame RSTTG and RSRTG with the BS. At this time, the RS negotiates the RSTTG and RSRTG through a capability negotiation with the BS. Also, during initial access performance with the BS or after the initial access performance, the RS performs the capability negotiation with the BS. For example, when the RS negotiates the RSTTG and RSRTG with the BS, the RS determines and transmits its own preferred RSTTG and RSRTG to the BS. Then, the RS identifies an RSTTG and an RSRTG through an RSTTG and RSRTG response signal provided from the BS. In another example, the RS determines and transmits its own preferred RSTTG and RSRTG to the BS. Then, the RS receives an RSTTG and an RSRTG determined by the BS, from the BS. At this time, the RS determines its own preferred RSTTG and RSRTG considering the maximum values of an RSTTG and an RSRTG. Here, the maximum values of the RSTTG and RSRTG can either be set as system information or be provided from the BS through broadcasting information.

After negotiating the RSTTG and RSRTG with the BS in step 709, the RS proceeds to step 711 and identifies a signal delay time with the BS. For example, the RS identifies a signal delay time acquired from an initial access process or random access process with the BS.

Alternatively, when it is judged not to negotiate the RSTTG and RSRTG with the BS in step 707, the RS proceeds to step 719 and receives an RSTTG and an RSRTG from the BS. For example, during initial access performance with the BS or after the initial access performance, the RS receives the RSTTG and RSRTG information broadcasted in the BS. In another example, before the initial access performance with the BS, the RS may identify the RSTTG and RSRTG through broadcasting information of the BS.

After receiving the RSTTG and RSRTG information from the BS in step 719, the RS proceeds to step 711 and identifies a signal delay time with the BS. For example, the RS identifies a signal delay time acquired from the initial access process or random access process with the BS.

Next, the RS proceeds to step 713 and identifies an idle time value (Idle_Time) for setting between a DL subframe and UL subframe of an RS frame to avoid interference between a direct link MS (i.e., an accessed MS) and a relay link MS. For example, the RS identifies an idle time value (Idle_Time) through broadcasting information of a BS. In another example, the RS may receive the idle time value (Idle_Time) from the BS in an initial access process with the BS. In another example, the RS may identify the idle time value (Idle_Time) set as a fixed value in a system. Although not illustrated, the RS may transmit the identified idle time information to an MS.

After identifying the idle time value (Idle_Time), the RS proceeds to step 715 and calculates a DL overhead (i.e., an R-TTI) and a UL overhead (i.e., an R-RTI) using the RSTTG and RSRTG information, the idle time value (Idle_Time), and the signal delay time with the BS. For example, the RS calculates the R-TTI and R-RTI using Equations 1 and 2. At this time, the RS resets a length of a CP to make lengths of DL and UL access zones 622 and 632 of an RS frame 610 shorter than lengths of DL and UL access zones 622 and 632 of a BS frame 600. Accordingly, the RS may not set separate R-TTI and R-RTI in Equations 1 and 2.

After calculating the DL overhead and UL overhead, the RS proceeds to step 717 and performs communication with the BS in consideration of the DL overhead and UL overhead.

After that, the RS terminates the procedure according to an embodiment of the present invention.

In the aforementioned embodiment, an RS either negotiates the R-TTI and R-RTI information with a BS or calculates the R-TTI and R-RTI information using the RSTTG and RSRTG information provided from the BS.

In an embodiment, an RS may identify an R-TTI and an R-RTI calculated and transmitted for each RS in a BS.

In the aforementioned embodiment, an RS determines its own CP length considering a length of a CP of a BS.

In another embodiment, a BS can determine a length of a CP of an RS based on its own CP length. Accordingly, the RS may receive its own CP length information from the BS.

Figure 8:
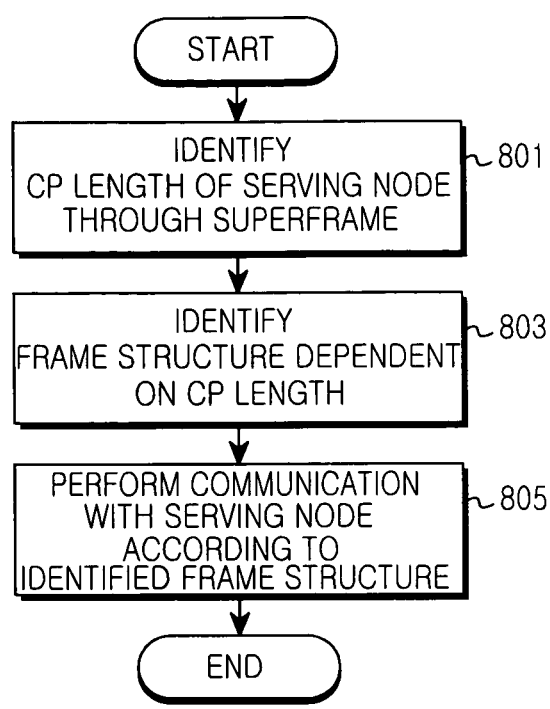
FIG. 8 illustrates a procedure of a Mobile Station (MS) in a relay wireless communication system according to an embodiment of the present invention.

As described above, an RS sets lengths of CPs of DL and UL access zones 622 and 632 differently from lengths of CPs of a BS in order to reduce an overhead caused by an R-TTI and an R-RTI. Accordingly, an MS operates as illustrated in FIG. 8 below considering a length of a CP of a serving node. Here, the serving node means a BS or RS providing a service to the MS.

FIG. 8 illustrates a procedure of an MS in a relay wireless communication system according to an embodiment of the present invention.

Referring to FIG. 8, in step 801, the MS identifies CP length information of a serving node included in a superframe header provided from the serving node.

After that, the MS proceeds to step 803 and identifies a frame structure dependent on the CP length information of the serving node. For example, the MS identifies lengths of DL and UL access zones 622 and 632 of a DL subframe 620 and UL subframe 630 dependent on the CP length information of the serving node.

After identifying the frame structure, the MS proceeds to step 805 and performs communication with the serving node. If the MS accesses an RS, the MS can transition during DL and UL relay zones 624 and 634 of the RS frame 610, although a TTG is not set to an RS frame 610.

After that, the MS terminates the procedure according to an embodiment of the present invention.

The following description is made for a construction of an RS for setting an R-TTI and an R-RTI to reduce an overhead caused by an operation transition gap.

Figure 9:
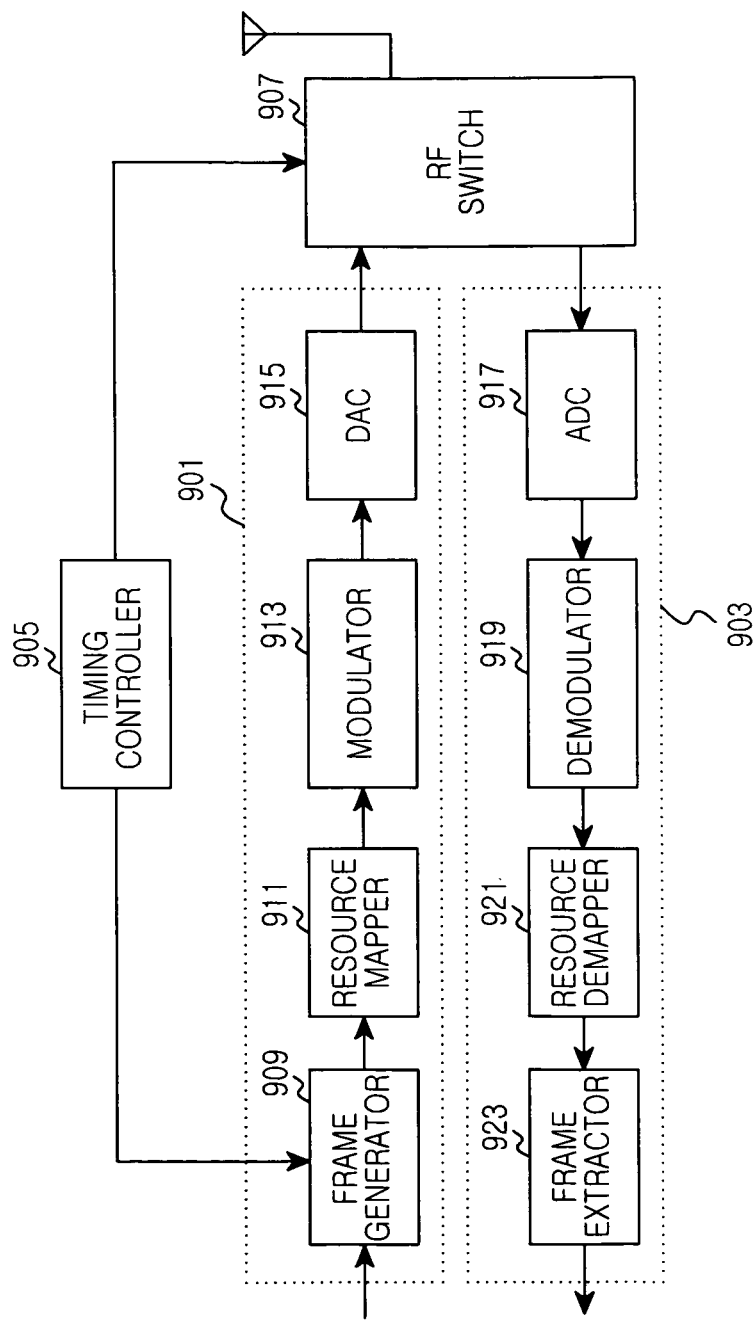
FIG. 9 illustrates a Relay Station (RS) in a multi-hop relay wireless communication system according to an embodiment of the present invention.

FIG. 9 illustrates a Relay Station (RS) in a multi-hop relay wireless communication system according to an embodiment of the present invention.

As illustrated in FIG. 9, the RS includes a transmission unit 901, a reception unit 903, a timing controller 905, and a Radio Frequency (RF) switch 907.

The transmission unit 901 includes a frame generator 909, a resource mapper 911, a modulator 913, and a Digital/Analog Converter (DAC) 915.

The frame generator 909 generates a frame depending on a control signal provided from the timing controller 905. For example, as illustrated in FIG. 3, the frame generator 909 configures a frame in order not to use a TTG between a DL subframe 320 and a UL subframe 330. At this time, the frame generator 909 configures a frame including an idle time set as a value less than the TTG between the DL subframe 320 and the UL subframe 330. The RS may not set an R-RTI of the UL subframe 330 in Equation 2.

In another example, as illustrated in FIG. 6, the frame generator 909 configures a frame by setting lengths of CPs of DL and UL access zones 622 and 632 differently from lengths of CPs of a BS. The RS may not set an R-TTI and an R-RTI in Equations 3 to 5.

The resource mapper 911 allocates each subframe provided from the frame generator 909 to a burst of a corresponding link, and outputs the allocated subframes.

The modulator 913 modulates the subframes allocated to the burst of each link received from the resource mapper 911 according to a corresponding modulation level (i.e., a Modulation and Coding Scheme (MCS)).

The DAC 915 converts a digital signal provided from the modulator 913 into an analog signal, and outputs the analog signal to the RF switch 907.

The reception unit 903 includes an Analog/Digital Converter (ADC) 917, a demodulator 919, a resource demapper 921, and a frame extractor 923.

The ADC 917 converts an analog signal received through the RF switch 907, into a digital signal. The demodulator 919 demodulates the digital signal provided from the ADC 917 according to a corresponding modulation level (i.e., an MCS) and outputs the demodulated digital signal.

The resource demapper 921 extracts actual subframes allocated to a burst of each link provided from the demodulator 919.

The frame extractor 923 extracts a subframe corresponding to the RS, from the subframes provided from the resource demapper 921.

The RF switch 907 connects a signal transmitted/received with the BS, an MS, and a different RS, to the transmission unit 901 and the reception unit 903, under the control of the timing controller 905.

The timing controller 905 generates a frame configured as illustrated in FIG. 3 or 6, and generates a control signal for transmitting/receiving a signal according to a frame configuration scheme. At this time, the timing controller 905 generates a control signal such that the transmission unit 901 and the reception unit 903 perform mode transition using RSTTG and RSRTG information provided from the BS.

As described above, the present invention has an advantage of being capable of increasing a data transmission efficiency of a system by removing an unnecessary operation transition gap in a relay wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operation method for a Relay Station (RS) in a relay wireless communication system, the method comprising:
identifying a signal delay time with an upper node;
determining a transmission/reception operation transition time through a negotiation with the upper node;
identifying an idle time;
determining an overhead caused by a transmission/reception operation transition with consideration of a start time point of an Uplink (UL) subframe of the RS dependent on the signal delay time, the transmission/reception operation transition time, and the idle time; and
performing communication considering the overhead,
wherein the start time point of the UL subframe of the RS is set earlier than a start time point of a UL subframe of the upper node with consideration of the idle time, and wherein the idle time represents an interval existing between a Downlink (DL) subframe of the RS and the UL subframe of the RS for synchronization between a frame of the upper node and a frame of the RS.

2. The method of claim 1, wherein the signal delay time is acquired from one of an initial access and a random access process with the upper node.

3. The method of claim 1, wherein identifying the idle time comprises identifying the idle time provided from the upper node.

4. The method of claim 1, wherein identifying the idle time comprises determining the idle time considering a length of a Cyclic Prefix (CP) included in one symbol.

5. The method of claim 1, further comprising, after identifying the idle time, transmitting the idle time to at least one MS.

6. The method of claim 1, wherein, among overheads caused by the transmission/reception operation transition, an overhead for the RS to make the transition from a receive mode to a transmit mode is determined using the equation below:

$$R\text{-}RTI = \begin{cases} 0 & \text{if } TTG - \text{Idle\_time} - RTD/2 \geq RSRTG \\ \text{OFDM\_SymbolUnit}(RSRTG + \text{Idle} + RTD/2 - TTG) & \text{if } TTG - \text{Idle\_time} - RTD/2 < RSRTG \end{cases}$$

$$\text{OFDM\_SymbolUnit}(x) = \lceil x / OFDMSymboltime \rceil$$

where,
R-RTI is an overhead of an Orthogonal Frequency Division Multiplexing (OFDM) symbol unit in the UL subframe of the RS,
RTD is the signal delay time between the upper node and the RS,
Idle time is necessary time value between the DL subframe of the RS and the UL subframe of the RS frame,
OFDMSymboltime represents one OFDM symbol duration in time axis, and
RSRTG is a time zone necessary for making the transition from the receive mode to the transmit mode in an actual physical device of the RS.

7. The method of claim 1, wherein the upper node is one of a base station (BS) and an upper RS.

8. An operation method for a Relay Station (RS) in a relay wireless communication system, the method comprising:
identifying a signal delay time with an upper node;
determining a length of a Cyclic Prefix (CP) of one Orthogonal Frequency Division Multiplexing (OFDM) symbol to be used by the RS that is less than a length of a CP of one OFDM symbol used by the upper node;
determining a transmission/reception operation transition time through a negotiation with the upper node;
determining an overhead caused by a transmission/reception operation transition using a length of an access zone dependent on the determined CP length; and
performing communication considering the overhead.

9. The method of claim 8, wherein the signal delay time is acquired from one of an initial access and a random access process with the upper node.

10. The method of claim 8, wherein among the overheads caused by the transmission/reception operation transition, an overhead for the RS to make a transition from a transmit mode to a receive mode is determined using the equation below:

$$R\text{-}TTI = \begin{cases} 0 & \text{if } RTD/2 + \alpha N \geq RSTTG \\ \text{OFDM\_SymbolUnit}(RSTTG - RTD/2 - \alpha N) & \text{if } RTD/2 + \alpha N < RSTTG \end{cases}$$

$$\text{OFDM\_SymbolUnit}(x) = \lceil x / OFDMSymboltime \rceil$$

where,

R-TTI is an overhead of an OFDM symbol unit in a Downlink (DL) subframe of the RS, RTD is the signal delay time between the upper node and the RS, RSTTG is a time zone necessary for an actual physical device of the RS to make the transition from the transmit mode to the receive mode, α is a time difference between the length of the CP of one OFDM symbol for DL access zone of an upper node frame and the determined length of the CP of one OFDM symbol for DL access zone of a RS frame, OFDMSymboltime represents one OFDM symbol duration in time axis, and N is a number of OFDM symbols constituting DL access zones of the upper node frame and the RS frame.

11. The method of claim 8, wherein, among the overheads caused by the transmission/reception operation transition, an overhead for the RS to make a transition from a receive mode to a transmit mode is determined using the equation below:

$$R\text{-}RTI = \begin{cases} 0 & \text{if } \alpha N - RTD/2 \geq RSRTG \\ \text{OFDM\_SymbolUnit}(RSRTG + RTD/2 - \alpha N) & \text{if } \alpha N - RTD/2 < RSRTG \end{cases}$$

$$\text{OFDM\_SymbolUnit}(x) = \lceil x / OFDMSymboltime \rceil$$

where,

R-RTI is an overhead of an OFDM symbol unit in an Uplink (UL) subframe of the RS frame, RTD is the signal delay time between the upper node and the RS, RSRTG is a time necessary for making the transition from the receive mode to the transmit mode in an actual physical device of the RS, α is a time difference between the length of the CP of one OFDM symbol for UL access zone of an upper node frame and the length of the CP of one OFDM symbol for UL access zone of a RS frame, OFDMSymboltime represents one OFDM symbol duration in time axis, and N is a number of OFDM symbols constituting UL access zones of the upper node frame and the RS frame.

12. The method of claim 8, further comprising, before determining the overhead, identifying an idle time, and wherein the idle time represents an interval existing between a Downlink (DL) subframe and an Uplink (UL) subframe of the RS for synchronization between a frame of an upper node frame and a frame of the RS.

13. The method of claim 12, wherein identifying the idle time comprises identifying the idle time provided from the upper node.

14. The method of claim 12, wherein identifying the idle time comprises determining the idle time in consideration of the determined CP length.

15. The method of claim 12, wherein determining the overhead comprises determining an overhead caused by the transmission/reception operation transition using a start time point of the UL subframe dependent on the transmission/reception operation transition time, the signal delay time, and the idle time.

16. The method of claim 15, wherein, among the overheads caused by the transmission/reception operation transition, an overhead for the RS to make a transition from a receive mode to a transmit mode is determined using the equation below:

$$R\text{-}RTI = \begin{cases} 0 & \text{if } TTG - \text{Idle\_time} - RTD/2 + \alpha N \geq RSRTG \\ \text{OFDM\_SymbolUnit}(RSRTG + \text{Idle\_time} + RTD/2 - TTG - \alpha N) & \text{if } TTG - \text{Idle\_time} - RTD/2 + \alpha N < RSRTG \end{cases}$$

$$\text{OFDM\_SymbolUnit}(x) = \lceil x / OFDMSymboltime \rceil$$

where,

R-RTI is an overhead of an OFDM symbol unit in the UL subframe of the RS,

RTD is the signal delay time between the upper node and the RS,

RSRTG is a time zone necessary for actual an physical device of the RS to make the transition from the receive mode to the transmit mode, α is a time difference between the length of the CP of one OFDM symbol for UL access zone of an upper node frame and the length of the CP of one OFDM symbol for UL access zone of the frame of the RS, N is a number of OFDM symbols constituting UL access zones of the upper node frame and the frame of the RS, Idle time is necessary time value between the DL subframe of the RS and the UL subframe of the RS, and OFDMSymboltime represents one OFDM symbol duration in time axis.

17. The method of claim 8, wherein the upper node is one of a base station (BS) and an upper RS.

18. A Relay Station (RS) apparatus in a relay wireless communication system, the apparatus comprising:

a timing controller configured to determine an overhead caused by a transmission/reception operation transition time determined through a negotiation with an upper node, and providing a timing signal dependent on the overhead;

a transmission unit configured to generate a frame according to a frame configuration scheme and transmit the frame through an antenna when transitioning to a transmit mode by the timing signal; and a reception unit configured to detecting and identifying a corresponding subframe in a frame received through the antenna when transitioning to a receive mode by the timing signal, wherein the timing controller provides the timing signal for a start time point of an Uplink (UL) subframe of the RS set earlier than a start time point of a UL subframe of an upper node with consideration of an idle time, and wherein the idle time represents an interval existing between a Downlink (DL) subframe of the RS and the UL subframe of the RS for synchronization between a frame of the upper node and a frame of the RS.

$$R\text{-}RTI = \begin{cases} 0 & \text{if } TTG - \text{Idle\_time} - RTD/2 \geq RSRTG \\ \text{OFDM\_SymbolUnit}(RSRTG + \text{Idle\_time} + RTD/2 - TTG) & \text{if } TTG - \text{Idle\_time} - RTD/2 < RSRTG \end{cases}$$

$$\text{OFDM\_SymbolUnit}(x) = \lceil x / OFDMSymboltime \rceil$$

19. The apparatus of claim 18, wherein, depending on a length of a Cyclic Prefix (CP) of one symbol, the idle time is one of provided from the upper node and determined by the RS.

20. The apparatus of claim 18, wherein the transmission unit transmits the idle time to at least one MS.

21. The apparatus of claim 18, wherein the timing controller determines an overhead for the RS to transition from the receive mode to the transmit mode using the equation below:

$$R\text{-}RTI = \begin{cases} 0 & \text{if } TTG - \text{Idle\_time} - RTD/2 \geq RSRTG \\ \text{OFDM\_SymbolUnit}(RSRTG + \text{Idle\_time} + RTD/2 - TTG) & \text{if } TTG - \text{Idle\_time} - RTD/2 < RSRTG \end{cases}$$

$$\text{OFDM\_SymbolUnit}(x) = \lceil x / OFDMSymboltime \rceil$$

where,

R-RTI is an overhead of an Orthogonal Frequency Division Multiplexing (OFDM) symbol unit in the UL subframe of the RS, RTD is the signal delay time between the upper node and the RS, Idle time is necessary time value between the DL subframe of the RS and the UL subframe of the RS, OFDMSymboltime represents one OFDM symbol duration in time axis, and RSRTG is a time zone necessary for making the transition from the receive mode to the transmit mode in an actual physical device of the RS.

22. The apparatus of claim 19, wherein the timing controller determines an overhead for the RS to transition from the transmit mode to the receive mode using the equation below:

where,

R-TTI is an overhead of an OFDM symbol unit in the DL subframe of the RS,

RTD is the signal delay time between the upper node and the RS,

RSTTG is a time zone necessary for an actual physical device of the RS to make the transition from the transmit mode to the receive mode, α is a time difference between the length of the CP of one OFDM symbol for DL access zone of an upper node frame and the length of the CP of one OFDM symbol for DL access zone of the frame of the RS, OFDMSymboltime represents one OFDM symbol duration in time axis, and N is a number of OFDM symbols constituting DL access zones of the upper node frame and the frame of the RS.

23. The apparatus of claim 19, wherein the timing controller determines an overhead for the RS to transition from the receive mode to the transmit mode using the equation below:

where,

R-RTI is an overhead of an OFDM symbol unit in the UL subframe of the RS,

RTD is the signal delay time between the upper node and the RS,

RSRTG is a time zone necessary for an actual physical device of the RS to transition from the receive mode to the transmit mode, α is a time difference between the length of the CP of one OFDM symbol for UL access zone of an upper node frame and the length of the CP of one OFDM symbol for UL access zone of the frame of the RS, N is a number of OFDM symbols constituting UL access zones of the upper node frame and the frame of the RS, OFDMSymboltime represents one OFDM symbol duration in time axis, and Idle time is necessary time value between the DL subframe of the RS and the UL subframe of RS.

24. The apparatus of claim 18, wherein the timing controller determines an overhead for the RS to transition from the receive mode to the transmit mode using the equation below:

$$R\text{-}TTI = \begin{cases} 0 & \text{if } RTD/2 + \alpha N \geq RSTTG \\ \text{OFDM\_SymbolUnit}(RSTTG - RTD/2 - \alpha N) & \text{if } RTD/2 + \alpha N < RSTTG \end{cases}$$

$$\text{OFDM\_SymbolUnit}(x) = \lceil x / OFDMSymboltime \rceil$$

$$R\text{-}RTI = \begin{cases} 0 & \text{if } \alpha N - RTD/2 \geq RSRTG \\ OFDM\_SymbolUnit(RSRTG + RTD/2 - \alpha N) & \text{if } \alpha N - RTD/2 < RSRTG \end{cases}$$

$OFDM\_SymbolUnit(x) = \lceil x / OFDMSymboltime \rceil$ where,

R-RTI is an overhead of an OFDM symbol unit in the UL subframe of the RS,

RTD is the signal delay time between the upper node and the RS,

RSRTG is a time necessary to transition from the receive mode to the transmit mode in an actual physical device of the RS, α is a time difference between the length of the CP of one OFDM symbol for UL access zone of an upper node frame and the length of the CP of one OFDM symbol for UL access zone of the frame of the RS, OFDMSymboltime represents one OFDM symbol duration in time axis, and N is a number of OFDM symbols constituting UL access zones of the upper node frame and the frame of the RS.

25. The apparatus of claim 18, wherein the upper node is one of a base station (BS) and an upper RS.

* * * * *